Sept. 30, 1952 W. F. HUCH 2,612,328
VARIABLE VOLUME BALLOON AND METHOD OF ITS MANUFACTURE
Filed July 13, 1950 5 Sheets-Sheet 1

$$W_s = \frac{\pi R}{n} \cos\left(\frac{s}{R} \cdot \frac{180°}{\pi}\right)$$

$$W_{MAX} = \frac{\pi R}{n}$$

INVENTOR:-
WILLIAM F. HUCH
BY William C. Babcock ATTORNEY

Sept. 30, 1952 W. F. HUCH 2,612,328
VARIABLE VOLUME BALLOON AND METHOD OF ITS MANUFACTURE
Filed July 13, 1950 5 Sheets-Sheet 3

INVENTOR.-
WILLIAM F. HUCH
BY William C. Babcock ATTORNEY

Sept. 30, 1952 W. F. HUCH 2,612,328
VARIABLE VOLUME BALLOON AND METHOD OF ITS MANUFACTURE
Filed July 13, 1950 5 Sheets-Sheet 4

INVENTOR:-
WILLIAM F. HUCH
BY William C. Babcock
ATTORNEY

Patented Sept. 30, 1952

2,612,328

UNITED STATES PATENT OFFICE 2,612,328

VARIABLE VOLUME BALLOON AND METHOD OF ITS MANUFACTURE

William F. Huch, St. Paul, Minn., assignor to General Mills, Inc., a corporation of Delaware Application July 13, 1950, Serial No. 173,620

15 Claims. (Cl. 244—31)

This application relates to balloons and more particularly to high altitude balloons capable of carrying a substantial payload.

High altitude or stratosphere balloons are already known in which the balloon body is made up of a large number of vertically extending gores or lunes joined to each other at their adjacent edges to form a gasproof bag. Such a balloon is shown for example in United States Patent 2,526,719 which is assigned to the assignee of the present invention. In the design of such balloons, it has been previously considered essential that at least the upper portion of the balloon be of spherical shape. The particular type shown in the above-mentioned patent has a spherical upper portion, while the lower portion of the balloon is in the form of a cone tangent to the lower portion of the sphere.

In the manufacture of such balloons, because of the relatively large sizes involved, it has been desirable to form the individual gores or lunes by means of a pattern, the shape of which is computed so that a predetermined number of such gores, when joined to each other at their longitudinal adjacent edges, will form a balloon body of the desired shape. The size of these gores, and the pattern by which they are formed, are chosen to yield a balloon body of predetermined volume which will lift the expected payload to the desired predetermined altitude. Altitudes of the order of 100,000 feet or more have been achieved by balloons of the general type described.

Ordinarily, balloons of this type are designed for maximum high altitude performance. There are occasions, however, when it is desirable in the course of upper air research to provide a balloon which will remain for a substantial period of time at a somewhat lower altitude. Since previously it has been considered essential to have the upper portion of the balloons spherical, it has accordingly been necessary to construct a balloon of the same shape, but of smaller size. In other words, the individual gores would be similar to those of the higher altitude balloon but would be smaller in all respects.

Where these gores are being made and assembled on a pattern or gore table of the type shown in the copending application of La Mere, Johnson, and Winzen, Serial No. 18,585, filed April 2, 1948, it was necessary to construct a new pattern or table for each balloon of different desired volume and altitude performance. Because of the size of the individual gores the construction of such separate patterns is extremely expensive and time consuming. It has therefore not been economical to provide for flights at a number of appreciably different altitudes.

Other attempts have been made to obtain flights at altitudes substantially below that for which the balloon is originally designed. For example, it has been suggested that the payload be increased in order to hold the balloon at a lower level. The strength of the balloon, however, sets a limit to the decrease in altitude which is possible by increasing the payload in this manner. The change in effective altitude may be as little as 6 to 10,000 feet by doubling or tripling a load. Such an attempt also increases the stresses on the balloon body and therefore can not be carried beyond the point at which the materials of the balloon will withstand the added strains.

Another suggestion which has been made is to use a gas which is somewhat heavier than that for which the balloon is designed but which is still lighter than air. Ordinarily these balloons are designed for use with helium. The number of other possible gases available is extremely limited and their general explosive quality and unavailability make this method of obtaining lower altitude flights impractical.

There has been a further suggestion that the helium used in such a balloon be diluted with air or other gases. This method is successful for moderate reductions in desired altitude. However, the amount of air required to dilute the helium rises exponentially with the decrease in altitude so that the use of this method is unsatisfactory where substantial reductions are desired.

With these defects and problems of the prior art in view, it is accordingly one object of the present invention to provide an improved high altitude balloon.

Another object is the provision of an improved process for the manufacture of high altitude or stratosphere balloons.

A still further object is the provision of a process of balloon manufacture in which a single gore pattern can be utilized to produce balloons of different predetermined volumes and shapes in order to achieve flights at different predetermined altitudes.

Another object is the provision of a process of balloon manufacture in which a gore pattern is designed to provide a balloon having a substantially spherical portion and in which provision is made for the utilization of the same gore pattern in the manufacture of balloons having a smaller volume than that for which the gore is originally designed.

Still another object is the provision of an improved method of making and capping a balloon of substantially smaller volume than that for which the gore pattern is designed.

A further object is the provision of a balloon capping process in which a long, spindle shaped balloon body is formed by seaming together a lesser number of gores than the predetermined number required to obtain a balloon having a spherical portion and in which the balloon body is capped by a conical member formed from the major sector of a circle of predetermined characteristics.

Other objects and advantages will be apparent from the following specification in which a preferred embodiment of the invention has been described with particular reference to the accompanying drawings. In these drawings.

Figures 1, 2:
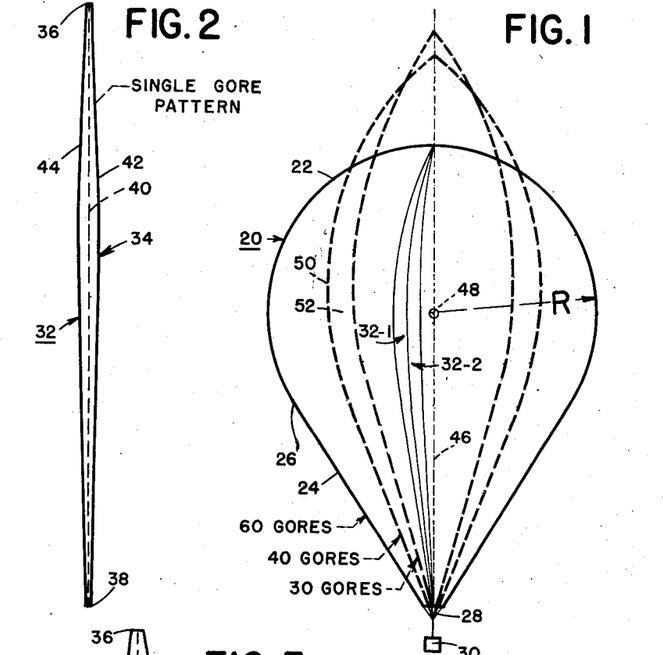
Figure 1 is a side elevation showing the shapes of a family of variable volume ballons made according to the invention.
Fig. 2 is a plan view of a single gore for use in the manufacture of any of the variable volume balloons of Fig. 1.

As illustrated in Fig. 1, the present invention provides a method of forming multiple gore high altitude balloons of different predetermined volumes and shapes. For performance at maximum altitude, a balloon of maximum volume is first designed. Such a balloon is illustrated at 20 in Fig. 1. In accordance with the teachings of the prior art, one preferred form for this balloon 20 of maximum performance includes a spherical upper portion indicated at 22 and a conical lower portion 24. The conical lower portion is tangent to the sphere along a substantially horizontal circle at point 26. The balloon 20 is designed to have a plurality of load lines 28 attached at its lower end for the suspension of a payload 30.

The balloon body itself, in accordance with the teachings of the above-mentioned patent, is preferably formed of a plurality of vertically or longitudinally extending gores or lunes 32, two of which are illustrated at 32—1 and 32—2 in Fig. 1. These gores are preferably made of light thermoplastic material and are seamed to each other at their adjacent longitudinal or vertical edges to form a balloon body 20 of the desired shape when a predetermined number of such gores have been united.

Various methods for the determination of the exact shape and dimensions of the individual gores are available in the prior art. Fig. 2 illustrates a single gore or gore pattern and indicates that this gore has a portion of maximum width at 34 which tapers in both directions toward the upper end 36 and lower end 38 of the pattern. Since the balloon body 20 is symmetrical about its vertical axis 46, which latter constitutes an axis of revolution, it is preferable that the individual gores 32 also be symmetrical with respect to their longitudinal or vertical center line 40. Thus the two longitudinally extending gore edges 42 and 44 are spaced equally on each side of the center line 40 and taper smoothly toward the center line at 36 and 38 from the point of maximum width 34.

Since the particular balloon 20 which is illustrated includes a conical lower portion instead of being a completely perfect sphere, it will be apparent that the portion of the gore 32 from the point of maximum width 34 toward the top 36 will differ both in length and exact shape from the gore portion between the point of maximum width 34 and the bottom 38 of the pattern. Should a spherical balloon be desired, these upper and lower gore portions would be the same.

Figure 3:
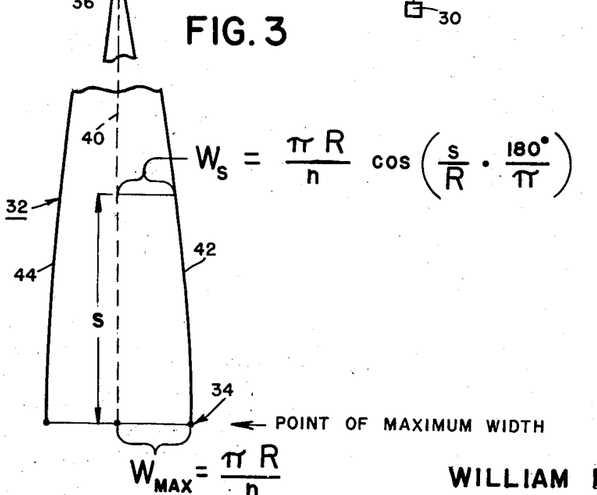
Fig. 3 is an enlarged partial view of the gore or gore pattern illustrating one method of determining the shape of a gore required to obtain a spherical balloon portion when a predetermined number of such gores are united.

Fig. 3 illustrates one method by which the exact gore dimensions can be determined at any point from the point of maximum width 34 toward that end of the gore which corresponds to the balloon portion for which a spherical shape is desired.

In the determination of this gore pattern the first step is to decide the size of the balloon body which is desired, this size being dependent upon the payload to be carried and the altitude to be reached. In the ballooon body 20 of Fig. 1, the spherical upper portion 22 of the balloon will have its center 48 located at some point on the vertical axis 46 of the balloon body. The upper spherical portion of the balloon 20 is indicated as having a radius R from the center 48 of this portion. In this particular case the center 48 will lie in a horizontal plane corresponding to the point of greatest circumference or maximum width of the balloon body.

When the radius R of this spherical portion has been determined, and when the number of desired gores has been decided upon, the design of the individual gore pattern can be started by computing the maximum width of the gore at point 34. In this case, for convenience, the dimension at this point of maximum width has been shown as the dimension of a half gore, i. e., the distance from the center line 40 to either of the symmetrical edges 42 and 44. Thus the method of computation to be illustrated herein can be used satisfactorily whether the gore pattern or table to be used corresponds to a complete gore as in the above La Mere, Johnson, and Winzen case, or whether a half gore pattern is used as in the later copending application of Stinger et al., Ser. No. 160,973, filed May 9, 1950.

As shown in Fig. 3, the distance from the center line to either gore edge at this point of maximum width 34 is determined by the formula $$W_{max} = \frac{\pi R}{n}$$

where R is the desired radius of the spherical portion of the balloon and $n$ is the desired number of gores to be used for such a balloon. Thus $n$ will be a whole number.

Where the balloon is relatively large, or where it is desired that the balloon shape very closely approximate a sphere, without substantial deviations due to the face that the gores are made of flat material which is substantially non-elastic, a relatively large number of gores will be utilized. Thus in the balloon shown at 20 in Fig. 1, for purposes of illustration, it is assumed that 60 gores are involved.

In Fig. 3, the distance of any other portion of the gore edges 42 and 44 from the longitudinal center line 40 can be determined according to the following formula:

$$W_s = \frac{\pi R}{n} \cos\left(\frac{s}{R} \cdot \frac{180°}{\pi}\right)$$

where R and $n$ have the same values as above and where $s$ is the distance along the center line 40 from the point of maximum width at 34 to the point at which the width $W_s$ is desired.

It is apparent in this expression that $W_s$ will equal zero when the distance $$s \text{ equals } \frac{\pi R}{2}$$

i. e., when $s$ corresponds to the length of arc of one-quarter of a great circle of a sphere having R as its radius. This would be the point of intersection of the gores 32 with the vertical axis 46 of balloon 20 in Fig. 1.

In actual practice, it is difficult to seam the gores to each other at this apex of the balloon if each gore does taper completely to zero and if the distance $s$ does increase to the full maximum represented by the distance $$\frac{\pi R}{2}$$

It is therefore customary to make the gore slightly shorter than required so that the upper end 36 of the gore will have a finite width. Thus the balloon body formed by uniting a plurality of such gores will have a small substantially circular opening at its apex. This opening must then be capped in some manner. In the case of a spherical balloon portion, the method of capping is preferably that shown in the above-mentioned patent. When the balloon body portion is nonspherical, as in the case of certain of the other variable volume balloons made according to the process of the present invention, then a different capping method and cap must be employed, for example the cap and method described in the later portions of this specification.

It should be noted that the actual value computed for the distance $W_s$ according to the above formula represents an approximation, since this formula yields the distance from the center line of the gore to one of its edges as measured along a "parallel," i. e., along the arc of intersection between the surface of the resulting sphere and a plane perpendicular to the vertical axis 46. Where the number of gores is relatively large, the formula can be used satisfactorily. On the other hand, where the number of gores $n$ is relatively small, the value of the expression $W_s$ may be further correceted or refined by the use of additional formulas. For most purposes, however, a gore pattern in which the dimensions are determined substantially according to the above formula will yield a spherical balloon portion of the desired radius R.

As indicated above, it has been generally thought and definitely taught in the prior art that flights at lower altitudes than that for which the balloon 20 was designed, would have to be obtained in one of the methods discussed in the introductory portions of this specification, i. e., by increasing the payload, by using a heavier gas than that for which the balloon was designed, by diluting the originally intended gas with air, or by redesigning the balloon on a smaller scale so that the same effective spherical shape for the upper portion of the balloon would be maintained but the individual gores would be shorter and narrower so that the resulting balloon would have smaller predetermined volume.

According to one feature of the present invention, I have found that it is possible to produce a balloon of desired lesser volume than that of the balloon 20, for example, by using the same gore pattern illustrated in Fig. 2 and designed in accordance with the specifications of Fig. 3 and seaming together the longitudinal edges of a number of gores which is substantially less than the number $n$ which was used in computation of the individual gore pattern. In other words, according to the present process, a gore pattern is first designed so that a predetermined number "$n$" of gores corresponding to the pattern will, when united, produce a balloon having a desired predetermined volume and shape. When different performance characteristics are desired, a plurality of gores represented by the number "$x$" will be seamed together, where "$x$" is a number substantially different from "$n$." Depending on the shape of gore originally designed and the shape of the balloon resulting therefrom, it is possible that "$x$" might be either greater or smaller than "$n$." In the present case, however, where the gore pattern is determined in such a fashion that $n$ gores will yield a balloon having a spherical portion at least at one end, then $n$ represents the maximum number of gores ordinarily used, while $x$ may be substantially less than $n$. Generally, $x$ would be chosen somewhere substantially within the range between $$\frac{n}{3}$$

and $n$ in this preferred form of balloon.

Since the particular gore pattern illustrated in Figs. 2 and 3 is designed to yield a balloon 20 having a spherical upper portion 22 as shown in Fig. 1 when the predetermined number of gores are joined, it will be apparent that the seaming together of a lesser number of gores will yield a balloon body which is nonspherical at its upper portion. Fig. 1 illustrates the shapes, as seen in side elevation, of two other balloons of the variable volume family made from the same gore pattern as illustrated in Figs. 2 and 3. The balloon whose shape is represented at 50 is one in which 40 instead of 60 gores have been seamed together. The maximum width or circumference of this balloon is substantially less than that of the balloon 20. At the same time the balloon 50 is somewhat longer or higher. Thus the general effect of reducing the number of gores in this form of the invention is to yield a more spindle-shaped or longer and narrower balloon.

The balloon shape indicated at 52 represents the case where 30 gores instead of the originally designed 60 have been seamed together. This particular balloon is even longer and narrower than the balloon 50. As indicated above, it is ordinarily preferable that the number of gores used be somewhere between one-third of the number which would yield a spherical shape and the number itself. The two cases illustrated represent the cases where $x$ equals two-thirds and $x$ equals one-half, respectively, of $n$.

Figure 4:
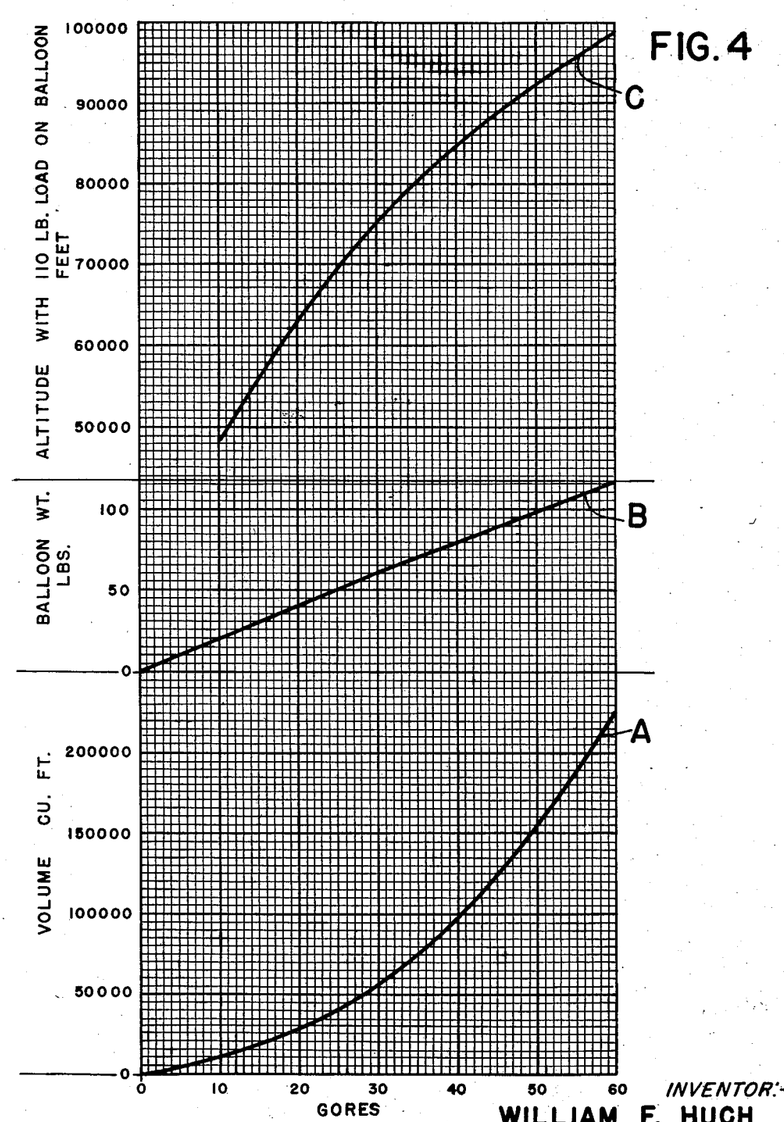
Fig. 4 is a composite graph showing the relationship between balloon volume, balloon weight, and altitude with 110 pound payload of balloons of one typical variable volume family having different predetermined numbers of gores.

Figure 4 is a composite graph illustrating certain characteristics of various balloons, including those shown in Fig. 1, which are made with different numbers of gores corresponding to the gore pattern of Figs. 2 and 3. In Fig. 4 the number of gores is plotted along a horizontal axis, while three different sets of values are plotted on the vertical axis. In curve A, the graph represents the volume in cubic feet of the finally resulting balloon plotted against the number of gores employed. Here it will be noted that a 60 gore balloon corresponding to shape 20 of Fig. 1 has a volume of roughly 225,000 cu. ft. A balloon of 40 gores has a volume of just under 100,000 cu. ft., while a balloon of 30 gores has a volume of the order of 55,000 cu. ft.

Curve B of Fig. 4 illustrates the relationship between balloon weight and number of gores. Since each of the gores is made to correspond to the same gore pattern, the weight of each gore will be the same and therefore this relationship is linear. The balloon weights shown for 60, 40, and 30 gore balloons are of the order of 120 pounds, 80 pounds, and 60 pounds, respectively.

Curve C of Fig. 4 illustrates the relationship between the number of gores and the altitude which can be expected with a 110 pound payload on the balloon. Thus the 60 gore balloon is illustrated as approaching the 100,000 ft. altitude, while the 40 and 30 gore balloons are suitable for use at altitudes of substantially 82,500 and 72,500 ft., respectively.

Obviously the specific values shown and illustrated in Fig. 4 will depend in any given case on the particular balloon shape and balloon volume for which the individual gore pattern is designed. The values will also depend on the type of material utilized in the construction of the balloon and in the number and weight of additional members which may be incorporated in the final product. Thus the values shown are designed primarily for purposes of illustration, to establish the fact that a wide range of performance characteristics can be achieved according to the methods of the present invention with the use of a single gore pattern of predetermined size and shape. For a given gore pattern, it is only necessary to know the performance characteristics which are desired in the final product and to select a number of gores which will yield a balloon having the desired characteristics.

As pointed out above, when the balloon has the spherically shaped upper portion for which the gores are ordinarily designed, it may be made and capped in the manner of the above patent. As described in that case, the balloon itself is made of polyethylene or similar material having the desired flexibility and other characteristics after prolonged exposure to ultraviolet light and low temperatures. The individual gores are preferably seamed to each other at their adjacent edges by a heat sealing or welding operation which forms a seam 33 of the same material integrally connecting the adjacent gores. Overlying the seams between adjacent gores are a plurality of load tapes 54 as shown in Figs. 5–12, inclusive.

According to that prior patent, the balloon cap was formed of a circular piece of similar thermoplastic material applied to the top opening and taped thereto in a specified manner. This capping operation is suitable for use where the upper portion of the balloon is substantially flat as in the case of the top or pole of a relatively large spherical portion.

In the present invention, however, there are cases where the number of gores is substantially less than the number required to yield a flat area at the point of intersection of the gores and in such cases it is necessary to provide a different capping means and method. According to the invention the cap is formed from a piece of thermoplastic sheet material similar to that from which the balloon body is formed, the cap being cut in flat form in the shape of a major sector of predetermined characteristics. It is known that the radial edges defining a given sector of flat material can be joined to each other and thereby form a cone from the sector of material, the angle of inclination of the walls or elements of the cone being determined by the number of degrees in the central angle included between the radial edges of the sector.

Figures 5, 6:
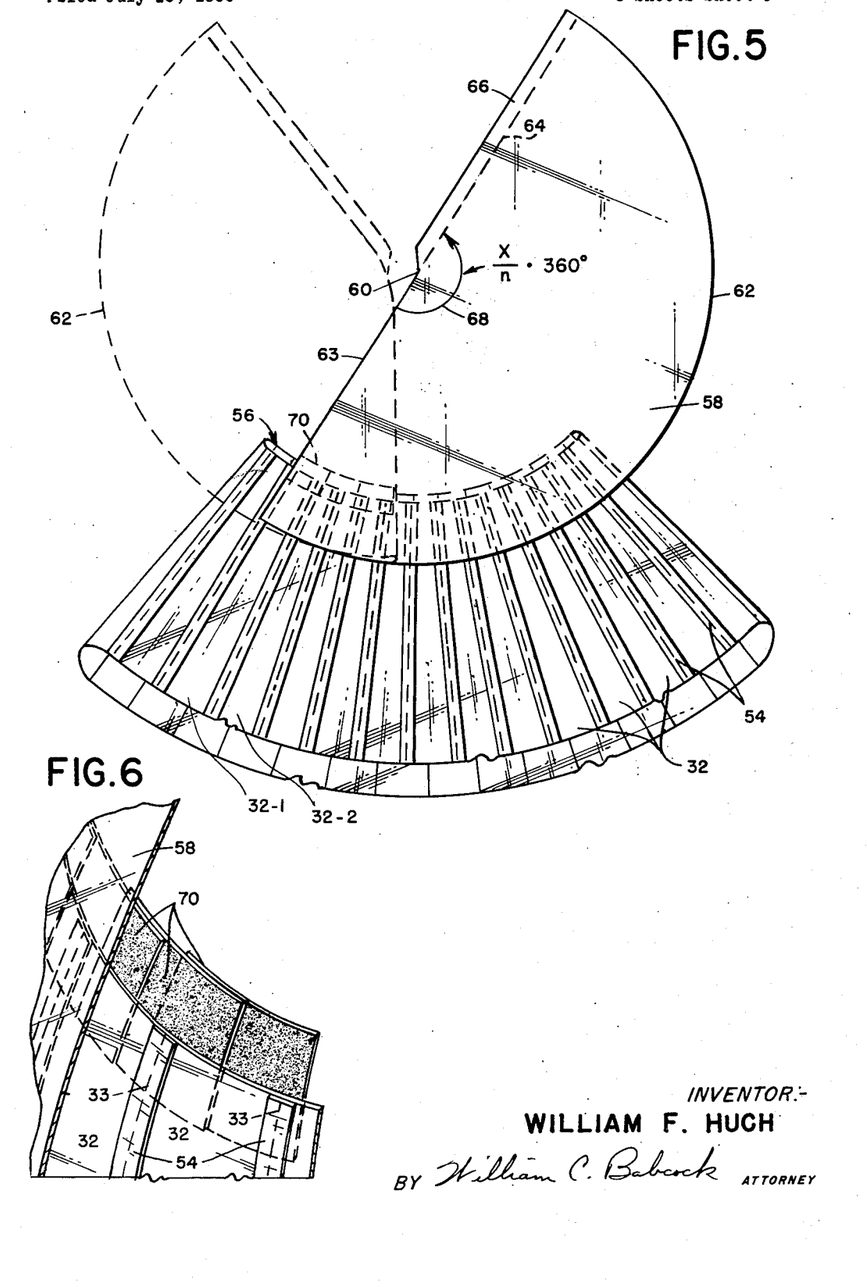
Fig. 5 is a partial perspective view showing details of a conical balloon cap and the method of its attachment to the balloon.
Fig. 6 is an enlarged partial view, with certain portions shown in section, showing details of the gas seal between the cap and body portions of Fig. 5.

In the present case, in the form of invention where the gore pattern is chosen so that "$n$" gores will yield a balloon portion of spherical shape at its apex, a satisfactory conical cap 58 may be made by taking a sector of a circle as illustrated in Fig. 5. The center of the circle is indicated at 60. The two radii which bound the sector are shown at 63 and 64, and the circular arc which completes the sector is shown at 62. The radius of the sector, i. e., the distance from the center 60 to the arc 62 is so chosen that the center 60 can lie at the point at which the edges of the individual gores 32 would intersect the vertical central axis of the balloon and would intersect each other if the gores were tapered completely to a point.

As indicated above, however, the upper ends of the gores are of finite width so that a top opening 56 is left in the balloon body. Thus the center 60 of the cap 58 is located at substantially what would have been the point of intersection of the gore edges. This is substantially the point at which a line tangent to the gore seam adjacent the opening would intersect the vertical axis of the balloon and opening. The radius from point 60 to the arc 62 of the cap is great enough so that a substantial area of the cap will overlap a corresponding area around the opening at the upper end of the balloon body. The length of the radial edges of the sector, or the slant height of the cone formed from such sector is accordingly substantially greater than the radius of the top opening. Similarly, the length of the arcuate edge of the sector, or the circumference at the base of the resulting cone, is substantially greater than the circumference of the opening.

To provide means for the formation of a conical cap from the sector 58, a flap 66 is provided at one of the radii bounding the sector, in this case along the radius 64. The angle 68 between the radial edges 63 and 64 of the sector 58 has a definite and distinct relation to the number of gores used, where the gores were originally designed to produce a spherical balloon portion when "$n$" gores were connected. The size of this angle is determined by the expression $$\frac{x}{n}\cdot 360°$$

where $x$ is the number of gores actually used and $n$ is the number which would yield a spherical section and for which the gore pattern was designed. In Fig. 5 a 30 gore balloon is illustrated and since the gores were designed for a 60 gore balloon having the shape shown at 20 in Fig. 1, the value of angle 68 is one-half of 360° or 180°.

The method by which the sector 58 is applied to the balloon body and formed into a conical cap is illustrated in Figs. 5–12, inclusive. The first step in the process is to lay out the upper end of the balloon body on a flat area substantially as shown in Fig. 5 and to apply the cap with the desired overlap as shown by the heavy line portions of Fig. 5. The edge or radius 63 of the cap is preferably aligned with one of the gore seams, i. e., with the seam and load bearing tape 54 at one edge of the gore 32—1. Once the alignment has been completed as shown in Fig. 5, the cap 58 is folded over from the heavy line to the dotted line position of the figure so that the first of a series of gas sealing members or tapes 70 may be applied. As shown in Fig. 6, the gas seal is formed by short lengths of tape having a pressure sensitive adhesive on one surface. These tapes 70 are placed on the inner side of the gores 32—1, 32—2, etc., at the upper edge of the balloon, with the sticky side of the tape facing outwardly so that good adherence will be obtained with the inner surface of each gore and also with the inner surface of the balloon cap 58. Because of the shape of opening 56 at the top of the balloon body and because of the difficulty of handling the pressure sensitive tape in large lengths, a plurality of relatively short tapes 70 are used as shown in Fig. 6 and are substantially overlapped to provide the necessary seal and strength.

After the gas seal is initiated at the region near the first radius 63 of the cap, the application of the gas seal is continued along the upper edges of the gores. As the gas seal tapes are applied, more and more of the capping member 58 is folded back over from the dotted line position of Fig. 5 toward the heavy line position. At the same time the balloon body of Fig. 5 is shifted so that in the particular application shown the upper portion or layer of the body is moved from right to left while the lower section is moved from left to right.

Figure 7:
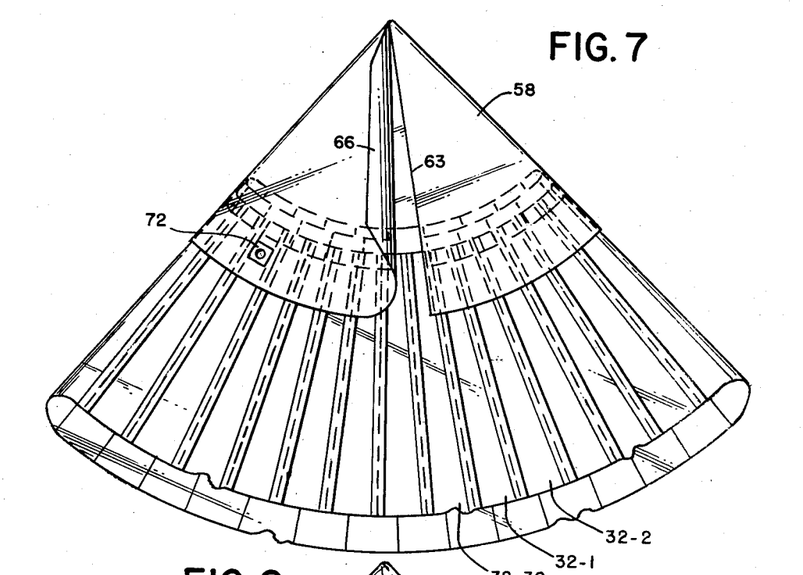
Fig. 7 is a view of the partially capped balloon just prior to completion of the formation of the gas seal and sealing together of the capped portions.

Fig. 7 illustrates the situation just before the gas seal is completed at the thirtieth gore. All that remains to be done to complete the gas seal is to apply one or two additional tapes 70 and fold down the flap 64 adjacent the free edge or radius of the cap. A reenforced bleed opening 72 may be provided in the cap at this time according to the teachings of the above patent to prevent destruction of the balloon cap and its fastenings due to expansion of air between the cap and body portions as the balloon reaches higher altitudes.

Figure 8:
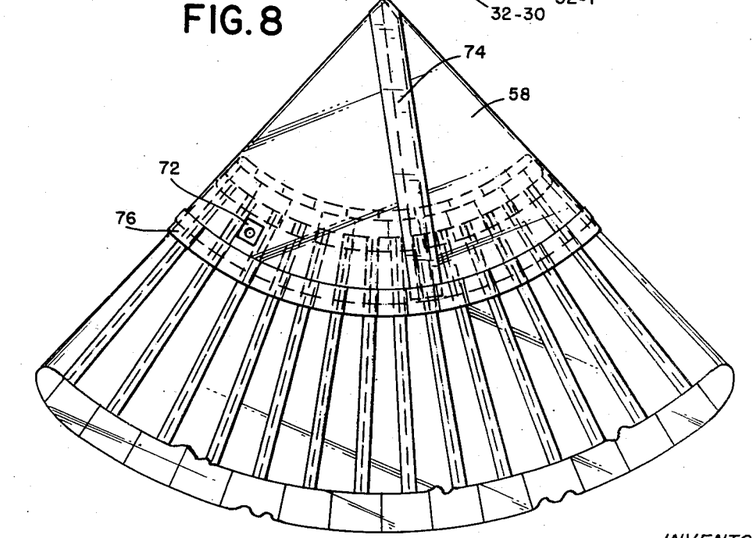
Fig. 8 is a view similar to Fig. 7 showing the conical cap fully in position and with its longitudinal edges secured together.
Figure 9:
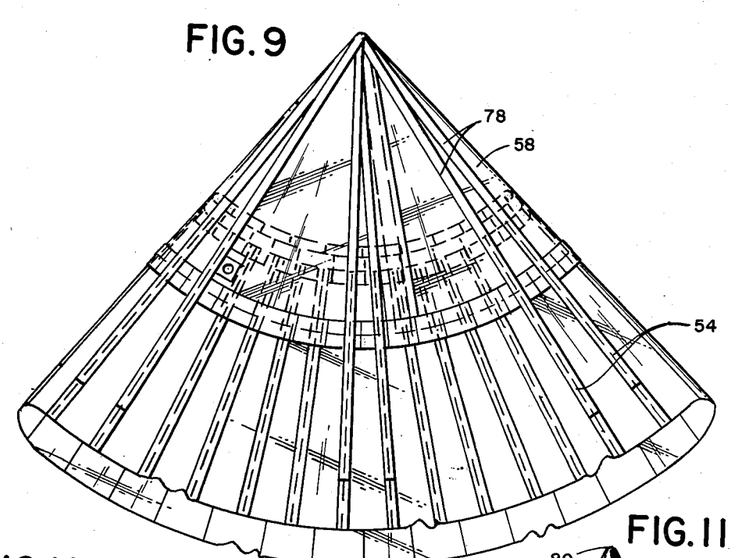
Fig. 9 shows a subsequent step in the capping process with certain of the desired load bearing tapes superimposed above the cap and the load bearing seams and tapes of the body portion.

As shown in Fig. 8, a sealing or securing tape 74, preferably of the type coated with pressure sensitive adhesive, is applied over the final flap 66 of the cap member to complete the attachment of the radial edges of the cap to each other. It will be noted that according to the present process this final securing or seaming by tape of the radial edges of the cap sector does not take place until the gas seal has been completed between the individual gores and the cap member.

As shown in Fig. 8, an additional series of tapes of the pressure sensitive adhesive type may be applied at 76 at the point where the lower edge of the conical cap 58 overlaps the gores 32. Tapes 76 increase the strength of the connection between the cap and balloon body and prevent any peeling action on the lower edge of the cap due to air currents.

Figures 10, 11, 12:
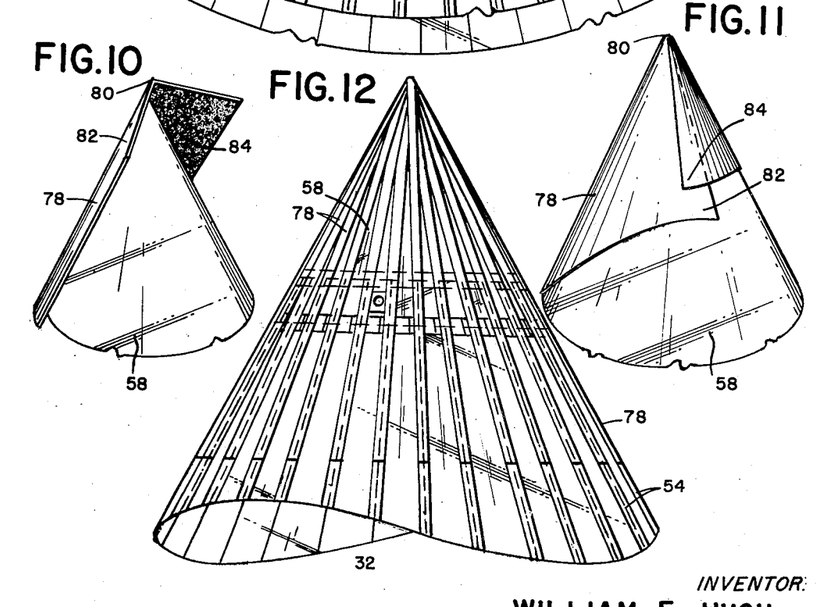
Fig. 10 illustrates the application of the load bearing tape at the very apex of the cap.
Fig. 11 shows the manner in which this apex end of the tape is finally secured.
Fig. 12 is a partial view of the completely capped and taped balloon body.

The final step in the completion of the cap is the application of a series of load bearing tapes 78 as illustrated in Figs. 9–12. These load bearing tapes 78 are also provided with pressure sensitive adhesive, in a preferred form of the invention, and overlap the load bearing tapes 54 of the balloon body. Tapes 78 are applied from a point on tapes 54 substantially below the cap and are extended up along the tapes 54 and seams 33 of the balloon body, across the overlapping portions of the cap and body and on up to the apex of the conical cap. At the apex the upper end 80 of the tape extends slightly beyond the peak of the cap and the free edges 82 and 84 are folded down on the cap as shown at 82 and 84 in Figs. 10 and 11. Fig. 12 illustrates the upper portion of the balloon body and cap when all of the top load bearing tapes 78 have been applied.

It has been found in practice that spindle shaped balloons with a conical cap made and applied according to the present invention have sufficient strength to accomplish the desired objects of the invention and to provide satisfactory performance at relatively high altitudes, even though the use of such a conical or spindle shaped upper portion has not previously been considered desirable in the stratosphere balloon field. The provision of such a cap and its method of manufacture, and the provision of a method of making balloons of different volumes and shapes by the use of different numbers of gores corresponding to a single pattern accordingly make it possible to accomplish the objects set forth at the beginning of the specification and to provide controlled high altitude flights at a wide range of different predetermined altitudes, without the extra expense and time required for the production of a different gore pattern or balloon table for each different altitude desired.

Since minor variations and changes in the exact details of construction will be apparent to persons skilled in this field, it is intended that this invention shall cover all such changes and modifications as fall within the spirit and scope of the attached claims.

Now, therefore, I claim:

1. The method of forming multiple gore balloons of different volumes and shapes with the aid of a single gore pattern designed to provide a balloon of predetermined volume and shape when a predetermined number of gores corresponding to the pattern are united, which comprises the steps of forming a plurality of gores according to the pattern, seaming one edge of a first gore to an edge of the second gore, successively seaming one edge of each additional gore to the remaining free edge of the preceding gore, and seaming together the remaining free edges of the first and last gores at a time when the total number of united gores is different from said predetermined number.

2. The method of forming multiple gore balloons of different volumes and shapes with the aid of a single gore pattern designed to provide a balloon having a spherical portion when a predetermined number of gores corresponding to the pattern are united, which comprises the steps of forming a plurality of gores according to the pattern, seaming one edge of a first gore to an edge of the second gore, successively seaming one edge of each additional gore to the remaining free edge of the preceding gore, and seaming together the remaining free edges of the first and last gores at a time when the total number of united gores is less than said predetermined number.

3. The method of successively forming multiple gore balloons of different volumes and shapes with the aid of a single gore pattern of definite predetermined shape which comprises the steps of forming a first balloon by (a) forming a plurality of gores corresponding to the pattern, (b) seaming one edge of the first gore to an edge of the second gore, (c) successively seaming additional gores to the remaining free edge of each preceding gore, and (d) after a predetermined number of gores have been seamed to each other, seaming together the remaining free edges of the first and last gores thereby completing a first balloon body of desired volume and shape, and forming a second balloon by following steps (a), (b) and (c) above, and then seaming together the remaining free edges of the first and last gores at a time when the total number of seamed gores is different from said predetermined number thereby completing a second balloon body of different volume and shape.

4. The method of forming multiple gore balloons of different volumes and shapes which comprises making a single gore pattern for a gore which is symmetrical with respect to its longitudinal axis, which tapers toward said axis at both ends, and which, when a predetermined number of gores corresponding to the pattern have been seamed together at adjacent longitudinal edges, is designed to provide a balloon body of predetermined volume with a spherical portion at least at one end of its axis; forming a plurality of gores corresponding to said pattern; and seaming together at their adjacent longitudinal edges a number of gores substantially less than said predetermined number, thereby forming a balloon body of smaller volume with a conical portion at said one end instead of said spherical portion.

5. The method of forming multiple gore balloons of different volumes and shapes which comprises making a single gore pattern for a gore which has a maximum transverse width equal to $1/n$ times the maximum circumference of a desired balloon having predetermined volume and shape, where $n$ is a whole number, forming a plurality of gores corresponding to said pattern; and uniting $x$ gores at their adjacent longitudinal edges to form a balloon body of different volume and shape, where $x$ is a whole number other than $n$.

6. The method according to claim 5 in which $x$ is less than n, and in which the gore pattern is formed to provide a balloon of $n$ gores which has the shape of a hemisphere from the region of maximum circumference to at least one end.

7. The method according to claim 6 in which the gore pattern is formed to provide a balloon of $n$ gores which has the shape defined by a sphere at one end and a cone tangent to the sphere at the other.

8. The method of forming balloons of different volumes and shapes from a plurality of gores which are each symmetrical with respect to a longitudinal center line, which comprises making a single gore pattern in which the maximum width from the longitudinal center line of the gore to one edge of the gore equals $$\frac{\pi R}{n}$$

where R is the radius of a spherical balloon portion of maximum desired volume and $n$ is a predetermined whole number and in which the gore shape between the point of maximum width and at least one end of the gore is determined substantially according to the formula:

$$W_s = \frac{\pi R}{n} \cos\left(\frac{s}{R} \cdot \frac{180°}{\pi}\right)$$

where s is the distance along the gore center line from the point of maximum width toward said one end, $W_s$ is the width from the gore center line to the gore edge at that distance, and R and $n$ are the same as above; forming a plurality of gores corresponding to said gore pattern, seaming one longitudinal edge of the first gore to a longitudinal edge of the second gore, seaming additional gores with one edge of each additional gore seamed to the remaining free edge of the preceding gore, until a total of $x$ gores have been joined, where $x$ is a whole number less than $n$, and seaming together the remaining free edges of the first and last gores thereby completing a balloon body of desired volume.

9. The method according to claim 8 in which $x$ is chosen substantially in the range of values between $n/3$ and $n$.

10. The method according to claim 8 in combination with the additional steps of forming a flat balloon cap in the shape of a sector of a circle in which the central angle between the radial edges bounding the sector equals $$\frac{x}{n} \cdot 360°$$

sealing the arcuate edge of the sector to the gores at said one end; and sealing together the radial edges of the sector to complete a conical cap.

11. The method according to claim 8, in combination with the additional steps of forming a flat balloon cap in the shape of a sector of a circle in which the central angle between the radial edges bounding the sector equals $$\frac{x}{n} \cdot 360°$$

sealing the arcuate edge of the sector to the gores at said one end, sealing together the radial edges of the sector to complete a conical cap; and adhesively securing a plurality of load bearing tapes to the cap, with one tape overlying each of the seams between adjacent gores and extending from the gore seam over the cap to the top of said conical cap.

12. The method of capping a substantially completed balloon body having a circular top opening which comprises forming a flat balloon cap in the shape of a sector of a circle in which the length of the arcuate edge of the sector is substantially the same as the circumference of a circular area of the balloon body enclosing the top opening and in which the length of the radial edges of the sector is greater than the radius of said circular area; securing the arcuate edge of the cap to the circumference of the circular area; and thereafter securing together the radial edges of the sector and thereby forming a conical cap above said opening.

13. A high altitude balloon having a spindle-shaped upper body portion comprising a plurality of vertically extending gores of gas proof material seamed together at their adjacent edges, the upper ends of the gores defining a top opening in a given horizontal plane, with the seamed gore edges immediately adjacent the opening being inclined upwardly toward a predetermined point on the central vertical axis of the balloon spaced substantially above the plane of said opening, and a conical cap member having a base edge which is secured to the body portion around the edge of the opening with the apex of the conical cap being located at said predetermined point.

14. A balloon according to claim 13 in which a load bearing tape is adhesively secured to the balloon body at each gore seam and extends over the conical cap to the top thereof, the upper end of the tape having its corners folded down and overlappingly secured to each other and to the cap top.

15. The method of capping a substantially completed balloon body having a circular top opening which comprises forming a flat balloon cap in the shape of a sector of a circle in which the length of the arcuate edge of the sector is substantially the same as the circumference of a circular area of the balloon body enclosing the top opening and in which the length of the radial edges of the sector is greater than the radius of said circular area; securing the point of intersection of the arcuate edge and one radical edge of the cap to the circular area of the balloon body adjacent the opening; successively securing the remaining portions of the arcuate edge of the cap to the circumference of the circular area; and thereafter securing together the radial edges of the sector and thereby forming a conical cap above said opening.

WILLIAM F. HUCH.

REFERENCES CITED

The following references are of record in the file of this patent:

UNITED STATES PATENTS

| Number | Name | Date |
|---|---|---|
| 1,553,340 | Upson | Sept. 15, 1925 |
| 2,449,813 | Lawson | Sept. 21, 1948 |

FOREIGN PATENTS

| Number | Country | Date |
|---|---|---|
| 4,104 | Great Britain | 1878 |

OTHER REFERENCES

Atkins: "Practical Sheet and Plate Metal Work," page 102, Figure 82.